United States Patent

[11] 3,574,295

[72] Inventor Toshio Tasaki
    Tokyo, Japan
[21] Appl. No. 835,038
[22] Filed June 20, 1969
[45] Patented Apr. 13, 1971
[73] Assignee Olympus Optical Co., Ltd.
    Tokyo, Japan
[32] Priority June 29, 1968
[33] Japan
[31] 43/44,934

[54] DEVICE FOR TAKING STEREOSCOPIC PHOTOGRAPH IN A STEREOSCOPIC MICROSCOPE
8 Claims, 12 Drawing Figs.

[52] U.S. Cl. .................................................. 95/18,
    95/12, 355/22
[51] Int. Cl. ............................................... G03b 35/08
[50] Field of Search ............................................ 95/12, 18;
    355/22, 33, 44, 55; 352/63

[56] References Cited
UNITED STATES PATENTS
2,990,759 7/1961 Marcosky ..................... 95/12
3,106,129 8/1963 Freuk et al. .................... 95/12
3,417,685 12/1968 Kato et al. ..................... 95/12
3,490,347 1/1970 Seedhouse ..................... 95/12

Primary Examiner—John M. Horan
Assistant Examiner—D. J. Clement
Attorneys—Kurt Kelman and Hans Berman ABSTRACT: A device for taking stereoscopic photographs in a stereoscopic microscope having optical axes with a parallax angle formed therebetween for stereoscopic observation of the object. The device comprises a camera body loaded with a film and an optical path switching means rotatably mounted in the microscope so as to permit same to alternately assume first and second positions in which light from the object is directed to the camera body from the two respective optical axes. A stereoscopic photograph is obtained by successively exposing the film at the first and second positions of the path switching means.

The camera body may comprise a pair of optical axes parallel to each other for simultaneously taking photographs of the object by the light coming from each of the two optical axes of the microscope.

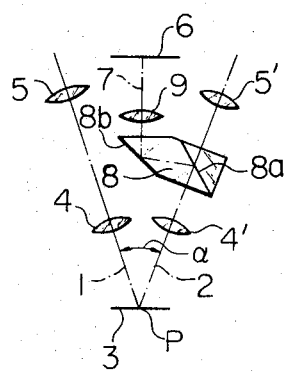
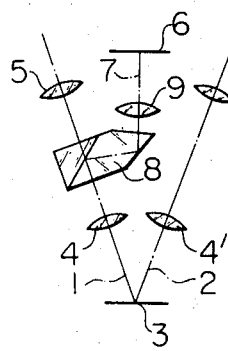
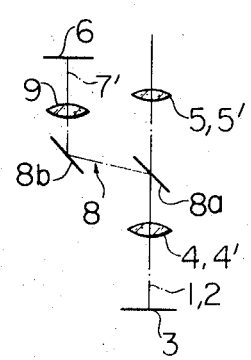
Fig. 1     Fig. 2     Fig. 4
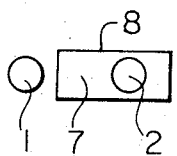
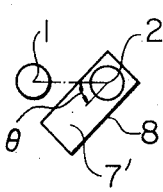
Fig. 3     Fig. 5     Fig. 6
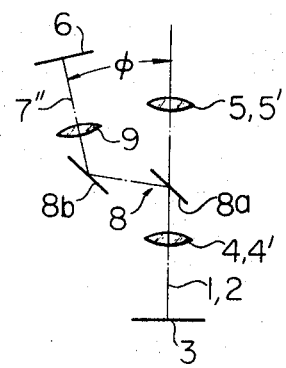
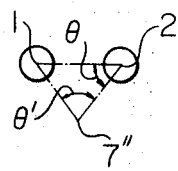
Fig. 7     Fig. 8
INVENTOR.
Toshio Tasaki
BY: Kelman and Berman
AGENTS INVENTOR.
Toshio Tasaki
BY: Kelman and Berman
AGENTS

DEVICE FOR TAKING STEREOSCOPIC PHOTOGRAPH IN A STEREOSCOPIC MICROSCOPE

BACKGROUND OF THE INVENTION

The present invention relates to a device for taking stereoscopic photograph in a stereoscopic microscope.

Heretofore, a device for microscopically taking stereoscopic photograph of an object has been known which comprises a camera housing and two films loaded therein, the plane of each of the films being inclined to each other so that the respective planes of the films are normal to each of the two optical axes forming therebetween a parallax angle. The light from an object passing in each of the optical axes is directed to the respective films through a microscopic optical system arranged in each of the two optical axes so as to obtain a set of stereoscopic photograph on each of the films.

Such a device is very complicated in construction and requires large space, and cannot be used with a conventional stereoscopic microscope. Moreover, the device as described above is exclusively used in taking stereoscopic photographs and can not be used for observing the object, thus making it inconvenient.

The present invention aims at avoiding the above described disadvantages of the prior art device for microscopically taking stereoscopic photographs.

SUMMARY OF THE INVENTION

An object of the present invention is to provide a novel and useful device for taking stereoscopic photograph in a stereoscopic microscope having two optical axes forming therebetween a parallax angle for the stereoscopic observation of an object.

Another object of the present invention is to provide a device of the type described above in which a set of stereoscopic photographs is obtained by successively taking photographs on a film while permitting the simultaneous stereoscopic observation of the object.

Still another object of the present invention is to provide a novel and useful device of the type described above in which a set of stereoscopic photographs is simultaneously taken on a film while permitting the simultaneous stereoscopic observation of the object.

Other objects and advantages of the present invention will be clear from the following description when read in connection with the accompanying drawings.

The above objects are achieved in accordance with the present invention by a device characterized by an optical path switching means which is rotatable about the optical axis of a camera body having a film loaded therein so that the switching means is alternately positioned at a first position at which it receives a portion of the light from one of the two optical axes of the stereoscopic microscope and directs the light to the optical axis of the camera body so that an image of the object is formed on the film and at a second position at which the switching means receives a portion of the light from the other of the two optical axes of the stereoscopic microscope and directs the light to the optical axis of the camera body so that an image of the object is formed on the film thereby permitting a set of stereoscopic photographs of the object to be obtained by successively taking photographs at the first and the second positions of the optical path switching means while permitting the simultaneous stereoscopic observation of the object.

In accordance with the a further feature of the present invention, the camera body is provided with two optical axes for simultaneously taking a set of stereoscopic photographs on the film loaded therein and a pair of beam splitting means are located in the respective optical axes of the stereoscopic microscope so that each of the beam splitting means receives a portion of the light in the respective optical axes of the microscope and directs the light thus received toward the respective optical axes of the camera body thereby permitting a set of stereoscopic photographs of the object to be simultaneously taken while permitting the simultaneous stereoscopic observation of the object.

In accordance with a still further feature of the present invention, the rotation of the image formed on the film about the center thereof which is caused by the parallax angle formed between the two optical axes of the microscope when the optical path leading to the camera body deviates out of the plane including the two optical axes of the microscope is compensated for by merely inclining the optical axis or the optical axes of the camera body after the light is reflected twice before it is directed to the optical axis of the camera body at an appropriate angle with respect to the plane including the two optical axes of the microscope.

BRIEF DESCRIPTION OF THE DRAWINGS

FIG. 1 is a schematic view showing the optical paths of a first embodiment of the device constructed in accordance with the present invention;

FIG. 2 is a view similar to FIG. 1 but showing an optical path switching means positioned at the opposite position to that shown in FIG. 1;

FIG. 3 is a plan view of the device shown in FIG. 1;

FIG. 4 is a side view of a modification of the device shown in FIG. 1 in which the optical axis of a camera body is offset from the plane in which the two optical axes of the microscope;

FIG. 5 is a plan view of the device shown in FIG. 4;

FIG. 6 is a view showing the rotation of the images of an object formed on a film in the device shown in FIGS. 4 and 5;

FIG. 7 is a side view similar to FIG. 4 but showing a modification of the device of FIG. 4 in which the optical axis of the camera body is inclined with respect to the plane including the two optical axes of the microscope;

FIG. 8 is a plan view of the device shown in FIG. 7;

DETAILED DESCRIPTION OF THE PREFERRED EMBODIMENTS

Figure 9:
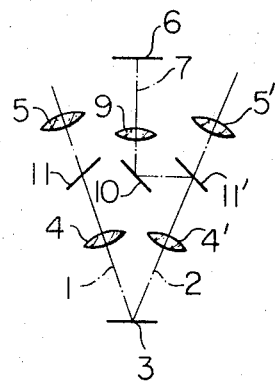
FIG. 9 is a schematic view showing a second embodiment of the device of the present invention.

In FIG. 1, two optical axes 1, 2 of a stereoscopic microscope are shown. These optical axes 1, 2 traverse each other at a parallax angle $\alpha$ so that the stereoscopic observation of an object 3 located at the intersecting point P of the two optical axes 1, 2 is obtained. In the conventional manner an objective lens 4 or 4' and an ocular 5 or 5' are optically arranged in the respective optical axes 1, 2 so that the microscopic observation is achieved. A camera body (not shown) with a film 6 loaded therein is interposed between the two optical axes 1.2. The optical axis 7 of the camera body is located in a bisector of the parallax angle $\alpha$ as shown.

In accordance with the present invention, an optical path switching means 8 is provided in the device of the present invention.

The optical path switching means 8 comprises a semitransparent light reflecting surface 8a and a light reflecting surface 8b as shown and the light reflecting surface 8b is rotatable about the optical axis 7 of the camera body.

The light transmitting surfaces of the optical path switching means 8 are made normal to the optical paths passing through the respective light transmitting surfaces as shown in FIG. 1. Thus, when the optical path switching means 8 is rotated so that the semitransparent light reflecting surface 8a is brought into either of the two optical axes 1,2 of the microscope, a portion of the light from the object 3 in either of the optical axes is reflected by the semitransparent light reflecting surface 8a toward the light reflecting surface 8b so that the light is directed in the optical axis 7 of the camera body through an objective lens 9 located in front of the film 6 thereby forming an image of the object 3 on the film 6 while the remaining portion of the light passes through the semitransparent light reflecting surface 8a for the observation of the object 3 through the ocular 5 or 5'.

Therefore, a set of stereoscopic photographs of the object 3 are obtained by successively taking photographs at the respective positions of the optical path switching means 8 at which the semitransparent light reflecting surface 8a is located in either of the two optical axes 1,2, while the simultaneous stereoscopic observation of the object 3 is permitted.

FIG. 2 shows the device of FIG. 1 in which the optical path switching means 8 is positioned oppositely to the position shown in FIG. 1.

FIG. 3 is a view as seen from the top of the device of FIG. 1.

FIG. 4 is a side view of a modification of the device shown in FIG. 1. In this embodiment, the optical axis 7' of the camera body is located in a plane spaced in parallel relation to the plane in which the two optical axes 1, 2 are located. Since the camera body is located offset from the two optical axes 1, 2, the observation of the object 3 through oculars 5, 5' is greatly facilitated without the interference caused by the camera body.

In this case, the optical path switching means 8 is rotated between the two optical axes 1, 2 by an angle 180°−2θ as shown in FIG. 5, wherein θ designates the angle formed between the line joining the two optical axes 1, 2 in the cross section of the device of FIG. 4 and the line joining either of the two optical axes 1, 2 and the axis of rotation of the optical path switching means 8 in the above described cross section.

In the device shown in FIG. 4, however, rotation of the image formed on the film 6 takes place as shown in FIG. 6 due to the parallax angle α formed between the two optical axes 1, 2 and the deviation of the light from the object leading to the light reflecting surface 8b out of the plane including the two optical axes 1, 2. This rotation of the image about its center must be compensated for in order to obtain a proper set of stereoscopic photographs.

In accordance with the present invention, the compensation of the rotation of the image on the film is made by merely inclining the optical axis 7'' of the camera body at an angle Φ with respect to the plane including the two optical axes 1, 2 as shown in FIG. 7.

The angle Φ is determined by the following formula:

$$\sin \varphi \cos \varphi \left( \cos \frac{\alpha}{2} \cos \theta + \sin \frac{\alpha}{2} \sin^2 \theta \right)$$
$$-\cos \varphi \sin \theta \left( \sin \frac{\alpha}{2} + \cos \frac{\alpha}{2} \cos \theta \right) + \cos^2 \varphi \sin \theta \cos \theta = 0$$

wherein

α = parallax angle between the two optical axes,
θ = angle between the line joining the two optical axes 1, 2 in the cross section of the device shown in FIG. 7 and the line joining either of the two optical axes 1, 2 and the axis of rotation of the optical path switching means 8 in the above described cross section.

Thus, when the optical axis 7'' is inclined at an angle Φ with respect to the plane in which the two optical axes 1, 2 are located, the rotation of the image of the object on the film 6 is compensated for so that a correct set of the stereoscopic photographs of the object are obtained.

When the values of the angle α and the angle θ are selected to be 3° and 50°, respectively, then the value of the angle Φ is about 6° 20'.

A second embodiment of the present invention is shown in FIG. 9. The device of FIG. 9 is similar in construction and the function to that of FIG. 1, except that a rotatable light reflecting surface 10 is located in alignment with the optical axis 7 while stationary semitransparent light reflecting surfaces 11, 11' are located in the respective optical axes 1, 2 in place of the optical path switching means 8 shown in FIG. 1.

By rotating the light reflecting surface 10 so as to receive the light from either of the semitransparent light reflecting surfaces 11, 11', the light is directed to the optical axis 7 of the camera body so that a set of stereoscopic photographs is obtained in like manner as described above.

It is apparent that the device shown in FIG. 9 may also be modified as shown in FIG. 4 or FIG. 7.

Figure 10:
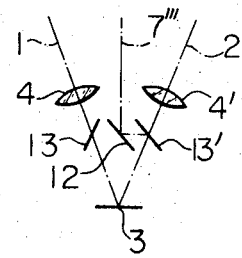
FIG. 10 shows a modification of the device of FIG. 9.

FIG. 10 shows a still further modification of the device of FIG. 9. In the device of fig. 10, the light reflecting surface 12 as well as the semitransparent light reflecting surfaces 13, 13' is located in front of the objective lenses 4, 4'. An optical system corresponding to those in the optical axes 1, 2 is provided in the optical axis 7''' for taking microscopic photograph of the object.

Figure 11:
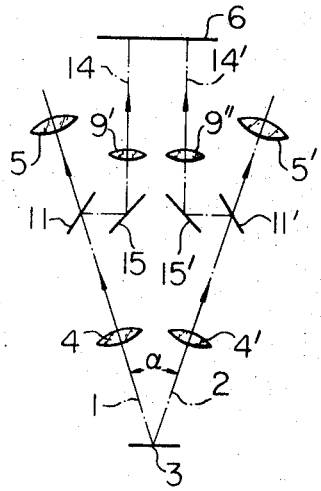
FIG. 11 is a view similar to FIG. 1 but showing a third embodiment of the device of the present invention in which a pair of optical axes are provided in the camera body.
Figure 12:
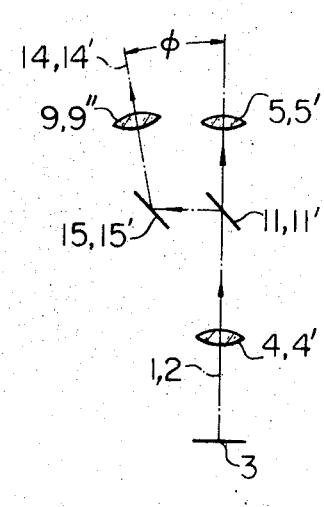
FIG. 12 is a side view showing a modification of the device of FIG. 11 in which the pair of optical axes of the camera body are inclined with respect to the plane including the two optical axes of the microscope.

FIGS. 11 and 12 show a third embodiment of the present invention. The device of FIGS. 11 and 12 is similar to that shown in FIG. 9, except that a pair of optical axes 14, 14' parallel to each other are provided in the camera body so as to permit a pair of stereoscopic photographs to be taken simultaneously on the film 6 through respective objective lenses 9', 9'' located in the respective optical axes 14, 14' and a pair of light reflecting surfaces 15, 15' are provided so as to receive the light from the respective semitransparent light reflecting surfaces 11, 11' so that the light is reflected toward the respective optical axes 14, 14' while the plane in which the pair of optical axes 9', 9'' is offset from the plane including the two optical axes 1, 2 with an angle Φ formed therebetween as in the case of the device shown in FIG. 7.

By the device of FIG. 11, a proper set of stereoscopic photographs of an object can be taken simultaneously while permitting the simultaneous stereoscopic observation of the object.

The light reflecting surface and the semitransparent light reflecting surface in the aforementioned embodiments may be embodied by either of a mirror or a prism.

I claim:

1. Device for taking stereoscopic photograph in a stereoscopic microscope having two optical axes in each of which an objective lens and an ocular are optically arranged for the microscopic observation of an object therethrough, said two optical axes forming a parallax angle therebetween so that stereoscopic observation is achieved when the object is viewed simultaneously through said two optical axes, wherein the improvement comprises a camera body having an optical axis located in symmetry with respect to said two optical axes and adapted for having a film loaded therein, and an optical path switching means, at least a portion of said optical path switching means being rotatable about said optical axis of said camera body between a first position at which a portion of the light from the object in one of said two optical axes is reflected twice so as to be directed to said optical axis of said camera body so as to form an image of the object on said film and a second position at which a portion of the light from the object in the other of said two optical axes is switched to be directed to said optical axis of said camera body so as to form an image of the object on said film, thereby permitting a set of stereoscopic photographs of the object to be obtained by successively taking photographs at said first and second positions of said optical path switching means, respectively, while permitting the stereoscopic observation of the object.

2. Device according to claim 1, wherein said optical axis of said camera body is offset from the plane in which said two optical axes of the microscope are located, thereby permitting the observation through said ocular in each of said two optical axes to be facilitated without causing the interference between said oculars and said camera body.

3. Device according to claim 2, wherein said optical axis of said camera body is inclined at an angle with respect to the plane including said two optical axes so that the rotation of the image formed on said film about the center thereof which is caused by the parallax angle between said two optical axes and the deviation of the light in each of said two optical axes out of the plane including said two optical axes by means of said optical path switching means is compensated for.

4. Device according to claim 1, wherein said optical path switching means comprises a light reflecting means and a semitransparent light reflecting means integral with said optical path switching means, said light reflecting means being rotatable about the optical axis of said camera body while said semitransparent light reflecting means is brought into either of the two optical axes of the microscope when said optical path switching means is rotated to either of said first and second positions.

5. Device according to claim 1, wherein said optical path switching means comprises a light reflecting means rotatable about said optical axis of said camera body and a semitransparent light reflecting means located stationarily in each of said two optical axes of the microscope, said semitransparent light reflecting means reflecting a portion of the light from the object in the respective optical axis to said light reflecting means while said light reflecting means reflects the light into said optical axis of said camera body when the same is rotated to receive the light from either of said semitransparent light reflecting means.

6. Device according to claim 1, wherein said optical path switching means is detachable from the microscope together with said camera body.

7. Device for taking stereoscopic photograph in a stereoscopic microscope having two optical axes in each of which an objective lens and an ocular are optically arranged for the microscopic observation of an object therethrough, said two optical axes forming a parallax angle therebetween so that stereoscopic observation of the object is achieved when the same is viewed simultaneously through said ocular in each of said two optical axes, wherein the improvement comprises a camera body having a pair of optical axes which are located in parallel to each other in symmetry with respect to said two optical axes of the microscope and adapted to have a film loaded therein, and a pair of beam splitting means each including a semitransparent light reflecting means and a light reflecting means, said semitransparent light reflecting means in each of said pair of beam splitting means being located in the respective optical axes of the microscope so as to reflect a portion of the light from the object in the respective optical axes while said light reflecting means in each of said pair of beam splitting means is so located as to reflect the portion of the light reflected by said semitransparent light reflecting means toward the respective optical axes of said camera body, thereby permitting a pair of stereoscopic photographs of the object to be obtained simultaneously on said film while permitting the simultaneous stereoscopic observation of the object.

8. Device according to claim 7, wherein the plane in which said pair of optical axes of said camera body are offset from the plane including said two optical axes of the microscope so as to facilitate the observation of the object without interference with said camera body, an angle being formed between the plane including said pair of optical axes of said camera body and the plane including said two optical axes of the microscope such that the rotation of each of the images on said film about the center thereof which is caused by the parallax angle between said two optical axes and the deviation of the light in each of said two optical axes out of the plane including the same is compensated for.